(12) United States Patent
Rochon et al.

(10) Patent No.: US 9,729,574 B2
(45) Date of Patent: Aug. 8, 2017

(54) SEAMLESS SWITCHOVER FOR ANTI-REPLAY CONNECTIONS IN MULTIPLE NETWORK PROCESSOR SYSTEMS

(71) Applicant: ALCATEL LUCENT CANADA, INC., Ottawa (CA)

(72) Inventors: Michel Rochon, Kanata (CA); Erel Ortacdag, Ottawa (CA); Jee Chiong Heng, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 341 days.

(21) Appl. No.: 14/180,535

(22) Filed: Feb. 14, 2014

(65) Prior Publication Data
US 2015/0237069 A1   Aug. 20, 2015

(51) Int. Cl.
H04L 29/06       (2006.01)
H04L 12/801      (2013.01)
H04L 12/939      (2013.01)

(52) U.S. Cl.
CPC ......... *H04L 63/164* (2013.01); *H04L 47/34* (2013.01); *H04L 49/552* (2013.01); *H04L 63/1466* (2013.01)

(58) Field of Classification Search
CPC .................................................. H04L 63/164
See application file for complete search history.

(56) References Cited

U.S. PATENT DOCUMENTS

| 6,055,236 A | 4/2000 | Nessett et al. |
| 7,003,118 B1 | 2/2006 | Yang et al. |
| 7,944,814 B2 | 5/2011 | Nissan et al. |

(Continued)

FOREIGN PATENT DOCUMENTS

| EP | 1284076 A2 | 2/2003 |
| EP | 1525535 A1 | 4/2005 |
| EP | 1614250 A2 | 1/2006 |

OTHER PUBLICATIONS

S.Kent et al.; BBN Techonologies; Security Architecture for the Internet Protocol; Internet Society;RFC 4301; Dec. 2005; pp. 1-102.

(Continued)

*Primary Examiner* — Shawnchoy Rahman
(74) *Attorney, Agent, or Firm* — Kramer & Amado, P.C.

(57) ABSTRACT

Various exemplary embodiments relate to a method, network node, and non-transitory machine-readable storage medium including one or more of the following: receiving, at the network device, an ownership indication that a first network processor is currently serving an anti-replay connection; and in response to receiving the ownership indication, effecting a presetting in a second network processor of a current sequence number (SN) for the anti-replay connection to a first value that is greater than or equal to a re-key threshold value, wherein the network device includes at least one of the first network processor and the second network processor wherein the re-key threshold value is a value beyond which an SN triggers re-keying of the anti-replay connection, and wherein the second network processor utilizes the current sequence number upon beginning to serve the anti-replay connection.

20 Claims, 4 Drawing Sheets

(56) References Cited

U.S. PATENT DOCUMENTS

| | | |
|---|---|---|
| 8,457,130 B2 | 6/2013 | Kumar et al. |
| 2009/0158417 A1* | 6/2009 | Khanna et al. ................ 726/12 |
| 2011/0228935 A1 | 9/2011 | Fukunaga |

OTHER PUBLICATIONS

S.Kent; Internet Society; IP Encapsulating Security Payload ( ESP);RFC 4303; Dec. 2005; pp. 1-105.

Notification of Transmittal of The International Search Report and The Written Opinion of the International Searching Authority, or the Declaration in International Application No. PCT/CA2015/050087 dated May 13, 2015.

Zhao et al., "RBWA: an efficient random-bit window-based authentication protocol", Global Telecommunications Conference, 2003, GLOBECOM '03 IEEE, vol. 3, No. pp. 1379, 1383 vol. 3, Dec. 1-5, 2003.

\* cited by examiner

US 9,729,574 B2

SEAMLESS SWITCHOVER FOR ANTI-REPLAY CONNECTIONS IN MULTIPLE NETWORK PROCESSOR SYSTEMS

TECHNICAL FIELD

Various exemplary embodiments disclosed herein relate generally to connection switchover and, more particularly but not exclusively, to switchover of anti-replay IPSec connections.

BACKGROUND

The IP Security ("IPSec") protocol suite (e.g., as defined by the Internet Engineering Task Force (IETF) request for comments (RFC) 4301) is a collection of protocols layered on top of standard IP implementations in an attempt to provide layers of security to network traffic. One such protocol is Encapsulated Security Payload ("ESP") (e.g. as defined by IETF RFC 4303), wherein packets belonging to a connection to be secured are encrypted and inserted as a payload into a packet destined for a downstream device that will decrypt the payload and further forward or process the original packet. This coordination between encrypting and decrypting devices involves periodic "re-keying" of the connection such that the key(s) used in the encryption/decryption process are agreed upon by both devices.

Encrypting the traffic, however, does not fully secure the connection against all forms of attack. For example, according to one form of attack known as a "replay attack," a malicious user may intercept one or more encrypted packets (e.g., packets associated with a user authentication process) from the secured connection and "replay" the packets to the decrypting node at a later time (e.g., to falsely authenticate the malicious user). To combat this type of attack, ESP provides an anti-replay feature whereby the encrypting node includes a sequence number on each packet. The decrypting node then checks each received packet to make sure that the sequence number is not lower than an window of sequence numbers expected based on the last received sequence number. If a packet is received with a sequence number that falls below the expected window, the packet is discarded. Thus, the sequence number verification provides protection against any replay attack in IPSec/ESP connections and other connections that implement such an anti-replay feature.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to a method performed by a network device for performing switchover of an anti-replay connection, the method including: receiving, at the network device, an ownership indication that a first network processor is currently serving an anti-replay connection; and in response to receiving the ownership indication, effecting a presetting in a second network processor of a current sequence number (SN) for the anti-replay connection to a first value that is greater than or equal to a re-key threshold value, wherein the network device includes at least one of the first network processor and the second network processor wherein the re-key threshold value is a value beyond which an SN triggers re-keying of the anti-replay connection, and wherein the second network processor utilizes the current sequence number upon beginning to serve the anti-replay connection.

Various embodiments relate to a network device for performing switchover of an anti-replay connection, the network device including: a control plane processor configured to: receive an ownership indication that a first network processor is currently serving an anti-replay connection; and in response to receiving the ownership indication, effect a presetting in a second network processor of a current sequence number (SN) for the anti-replay connection to a first value that is greater than or equal to a re-key threshold value, wherein the re-key threshold value is a value beyond which an SN triggers re-keying of the anti-replay connection, and wherein the second network processor utilizes the current sequence number upon beginning to serve the anti-replay connection; and at least one of the first network processor and the second network processor.

Various embodiments relate to a non-transitory machine-readable storage medium encoded with instructions for execution by a network device for performing switchover of an anti-replay connection, the non-transitory machine-readable storage medium including: instructions for receiving, at the network device, an ownership indication that a first network processor is currently serving an anti-replay connection; and instructions for, in response to receiving the ownership indication, effecting a presetting in a second network processor of a current sequence number (SN) for the anti-replay connection to a first value that is greater than or equal to a re-key threshold value, wherein the network device includes at least one of the first network processor and the second network processor wherein the re-key threshold value is a value beyond which an SN triggers re-keying of the anti-replay connection, and wherein the second network processor utilizes the current sequence number upon beginning to serve the anti-replay connection.

Various embodiments are described wherein the second network processor is part of a different network device from the network device and the step of effecting a presetting in a second network processor of a current sequence number (SN) includes: communicating with the different network device via a control link to indicate that SN presetting is to be performed.

Various embodiments additionally include receiving a further ownership indication that the second network processor is currently serving the anti-replay connection; and in response to receiving the further ownership indication, effecting a presetting in a third network processor of a current sequence number (SN) for the anti-replay connection to a second value that is greater than the first value.

Various embodiments are described wherein the difference between the re-key threshold value and the first value is the same as the difference between the first value and the second value.

Various embodiments are described wherein the difference between the re-key threshold value and the first value is selected to provide the first network processor with a predetermined amount of time of serving the anti-replay connection after reaching the re-key threshold value and before reaching the first value, wherein the predetermined amount of time is at least ten seconds.

Various embodiments additionally include receiving an indication that the second network processor has transmitted a message for the anti-replay connection having an SN greater than or equal to the re-key threshold value; in response to receiving the indication that the second network processor has transmitted a message for the anti-replay connection having an SN greater than or equal to the re-key threshold value, effecting re-keying of the anti-replay connection with at least one downstream device.

Various embodiments are described wherein at least one of the network device and a downstream device at an opposite end of the anti-replay connection is a host device.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein. Further, while various exemplary embodiments are described with regard to an IPSec/ESP connection, it will be understood that the techniques and arrangements described herein may be implemented to facilitate switchovers in other types of connections that implement similar anti-replay or sequence numbering features.

Figure 1:
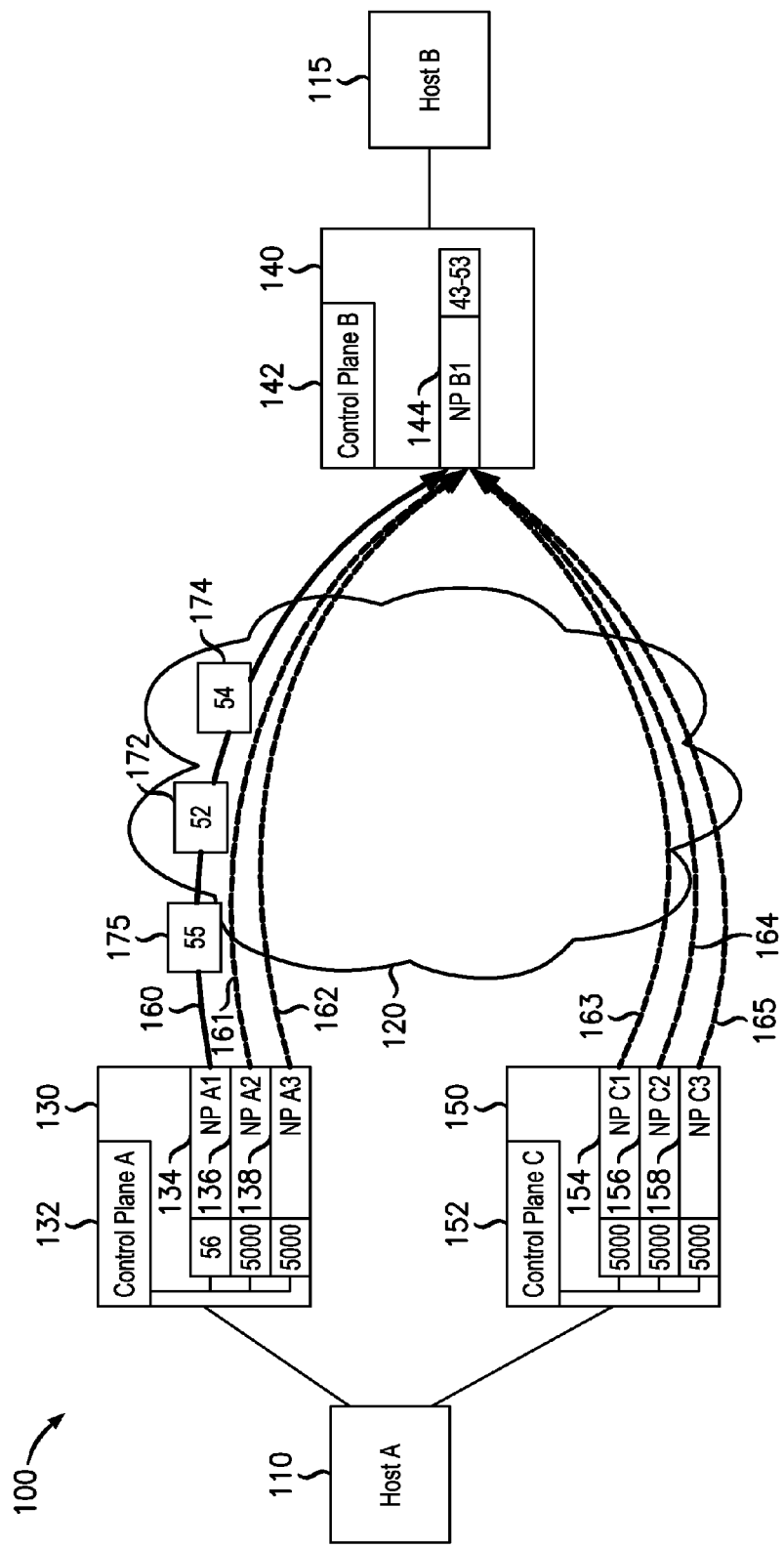
FIG. 1 illustrates an exemplary environment for establishing an anti-replay connection.

FIG. 1 illustrates an exemplary environment 100 for establishing an anti-replay connection. As shown, the environment 100 includes two hosts, host A 110 and host B 115 in communication via a network 120, at least partially. The hosts 110, 115 may be virtually any devices such as, for example, personal computers, tablets, mobile phones, servers, blades, or any other network-connected device Likewise, the network 120 may be any network such as the Internet or other Internet protocol (IP) network.

As shown, the environment 100 includes three intermediate network devices 130, 140, 150 between the hosts 110, 115. It will be understood that various additional intermediate network devices may be disposed between any of the devices shown in FIG. 1, and that exemplary environment may be an abstraction. The intermediate network devices 130, 140, 150 may be any devices capable of receiving and forwarding network traffic such as, for example, switches or routers. For the purposes of explanation, the network devices 130, 140, 150 are referred to herein as routers; however, various modifications for implementation in other intermediate network devices will be apparent. In the exemplary environment, a secure connection is established between the router A 130 and router B 140.

Router A 130 includes a control plane 132 and three network processors 134, 136, 138. As will be understood, the control plane 132 may be a component of network device A 130 that manages the forwarding operations of the network processors 134, 136, 138 by, for example, maintaining a network map and pushing forwarding information to the network processors. The control plane 132 may also implement a control link for signaling with other control planes, such as the control plane 142 of router B 140 or control plane 152 of router C 150. For example, when rekeying is to be performed for an anti-replay connection, the control plane 132 may communicate with control plane 142 to perform this process. As another example, in a multi-chassis embodiment, the control planes 132, 152 may communicate to coordinate the redundancy provided therebetween. For example, the control plane 132 may share encryption keys with the control plane 152 for protected anti-replay connections. Various other communications between the control planes 132, 142, 152 will be described in greater detail below.

The network processors 134, 136, 138 may each receive, process, and forward network traffic. In various embodiments, the network processors 134, 136, 138 may include a switching fabric (not shown) disposed therebetween such that the network processors 134, 136, 138 may transmit packets between each other. For example, in some embodiments, each network processor 134, 136, 138 upon receiving a packet may transmit the packet via the switching fabric to a proper egress network processor 134, 136, 138 for forwarding. It will be understood that additional or fewer network processors may be included in the router A 130.

Similar to router A 130, router B 140 includes a control plane 142 and at least one network processor 144 for receiving packets over the secure connection. Router C 150 also includes a control plane 152 and three network processors 154, 156, 158, although additional or fewer network processors may be included. It will be understood that additional routers (not shown) may be deployed in a multi-chassis arrangement with router A 130 such that connections may be switched over among a group of routers.

It will further be understood that, while the exemplary environment is described as implementing a secure connection between intermediate network devices 130, 140, 150, various alternative environments (not shown) may implement the secure connection between the two hosts (e.g., user devices or servers) 110, 115, or a host 110, 115 and one or more intermediate network device 130, 140, 150. Accordingly, it will be apparent that various techniques and arrangements described herein may alternatively be adapted to be implemented in the hosts 110, 115.

In the example of FIG. 1, NP A1 134 and NP B1 144 have a secure connection 160 established therebetween. For example, the secure connection 160 may be an IPSec connection implementing ESP and anti-replay. As such, the upstream NP 134 maintains a sequence number (currently set at a value of "56") while the downstream NP 144 maintains a sliding window of sequence numbers that will be accepted. As shown, this window is currently set to a value of "43-53," indicating that only packets with sequence numbers that are greater than "43" will be accepted and that the highest packet sequence number received on the connection 160 since the last re-keying is "53." Thus, the NP B1 144 is configured to reject any packets with sequence numbers that are more than 10 below the highest received sequence number or that have already been received. It will be apparent that this trailing window width of "10" is provided as an example and that various configurations may use alternative trailing window widths.

Three packets 172, 174, 175 are shown as being currently in flight. These packets have sequence numbers of "52", "54" and "55" respectively. As shown, the packet 172 with sequence number "52" is currently destined to arrive after both the packet 174 with sequence number "54" and the packet (not shown) with sequence number "53" (already received by the NP 144). Such packet reordering by the network is a common occurrence and may be caused by a variety of sources. As such, the width of the trailing window at NP B1 144 is selected in various embodiments to accommodate the magnitude of packet reordering expected to be encountered in the network. Upon receiving the first in-flight packet 174, the NP B1 144 will process the packet because the sequence number ("54") is higher than the highest received sequence number ("53"). The NP B1 144 then updates the sliding window to a value of "44-54." Next, upon receiving the second in-flight packet 172, the NP B1 144 will process the packet because the sequence number ("52") falls within the window ("44-54"). The NP B1 144 does not update the sliding window because the received sequence number is not higher than the previous highest received sequence number. Next, upon receiving the third in-flight packet 175, the NP B1 144 will process the packet because the sequence number ("55") is higher than the highest received sequence number ("54"). The NP B1 144 then updates the sliding window to a value of "45-55." After sending the most recent packet, 175, NP A1 134 maintains a sequence number of "56" for the next packet to be transmitted over the secure connection.

Many deployments enable switchover of a secure connection from an NP to another NP, either within the same router or on another router (or other device). For example, a change in network conditions or topology, network processor failure, or a manual operator input may trigger another network processor to begin servicing an existing secure connection. As shown, each of the upstream network processors 136, 138, 154, 156, 158 may establish a potential link 161, 162, 163, 164, 165 to serve a secure connection after switchover. If the network processor to take over the secure connection restarts the sequence number at "1," however, the downstream network processor will discard all received packets until the sequence number reaches the current window, according to the anti-replay feature. Thus, in the example of FIG. 1, 42 packets would be discarded if a network processor restarted the sequence number at "1."

According to various embodiments, the routers 130, 150 are configured to enable seamless switchover of connections implementing anti-replay features. In such embodiments, when a network processor, such as NP A1 134 begins servicing a new anti-replay connection, the NP A1 134 informs the control plane A 132 that NP A1 134 has taken ownership of the anti-replay connection. Thereafter, the control plane A 132 presets the other NPs 136, 138 that may potentially service the anti-replay connection in the future with sequence numbers for the anti-replay connection that are sufficiently high to be accepted by the downstream network processor 144 after switchover. In a multi-chassis deployment, the control plane A 132 also communicates with the control plane C 152 to similarly preset the sequence number of the NPs 154, 156, 158. In some embodiments, the preset sequence number is selected to be higher than a re-keying threshold. As will be understood, the "re-keying" threshold is a sequence number threshold that, when passed, triggers a re-keying of the anti-replay connection (which includes resetting the sequence number and trailing window to zero). In various embodiments, re-keying essentially establishes a new connection (e.g. a new security association with its own security parameter index). Thus, on switchover, the packets processed by the new NP will be accepted downstream and a re-keying of the connection to reset sequence numbers will be triggered.

As shown, the NPs 136, 138, 154, 156, 158 have been preset with the sequence number "5000" and the re-key threshold may be "2500." As such, even if the re-key threshold had been met and re-keying had been initiated but not completed prior to switchover, the preset sequence number may be sufficiently high to prevent packets from being discarded. In various embodiments, the increment above the threshold chosen for the preset sequence number is selected to provide a predetermined amount of time for performing re-keying. For example, the increment of "2500" above the re-key threshold of "2500" may be selected because it is estimated that 2500 packets will be processed in 10 seconds. By this mechanism, if re-keying was initiated 5 seconds prior to a switchover, the sequence number of the original NP is estimated to not surpass the preset value of 5000, thereby providing for a hitless switchover. It will be understood that in various implementations, this preset number will be much higher and closer to the maximum sequence number, such as the highest number representable by 32 bits (e.g., the sequence number size used in IPSec).

Figure 2:
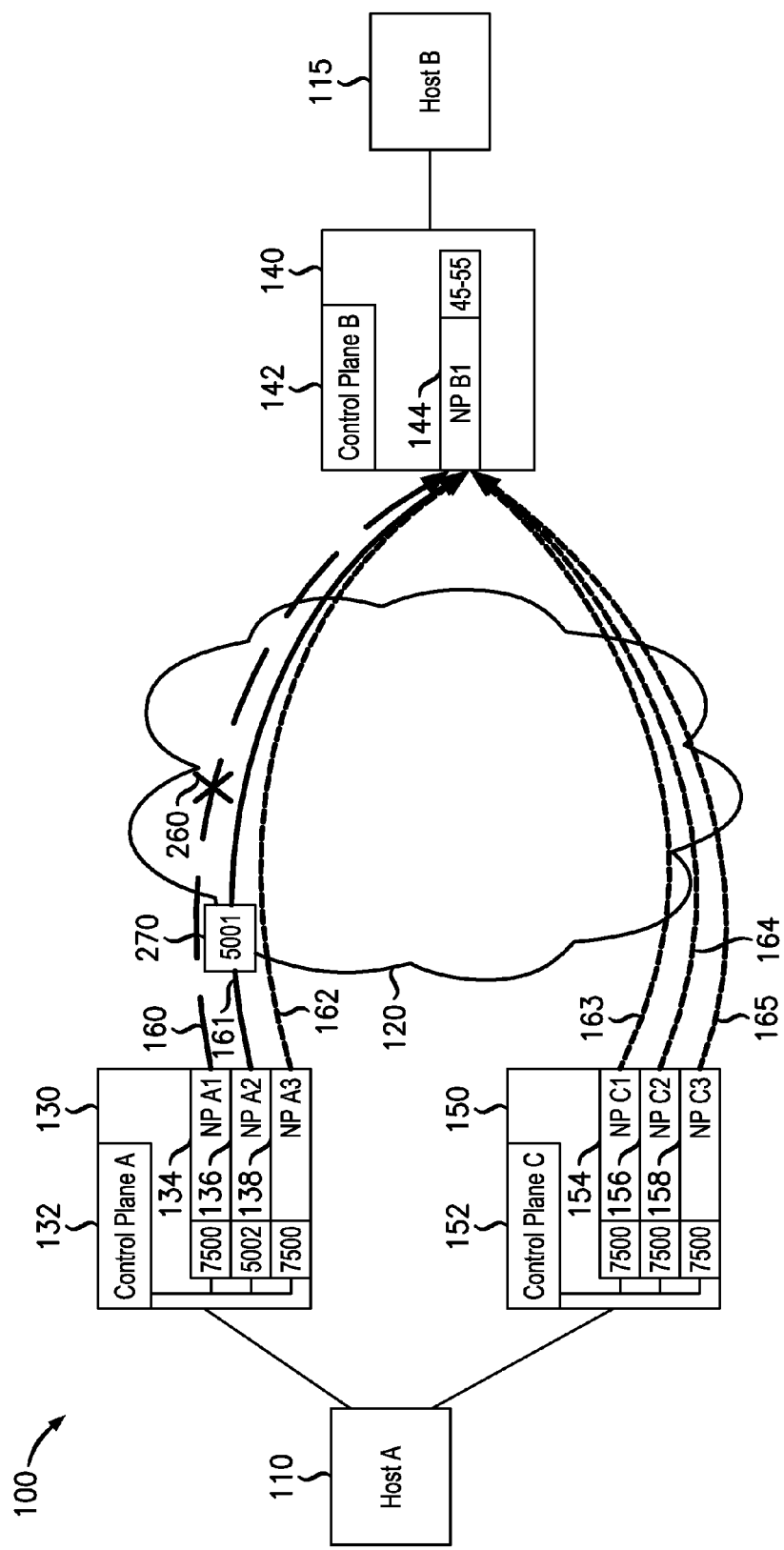
FIG. 2 illustrates an exemplary environment for establishing an anti-replay connection after switchover to a second network processor.

FIG. 2 illustrates an exemplary environment 200 for establishing an anti-replay connection after switchover to a second network processor. The exemplary environment 200 corresponds to the exemplary environment 100 at a later point in time, after a switchover has occurred. For example, a network failure 260 may have forced NP A2 136 to take ownership of the connection and forward packets over link 161. As shown, because the sequence number was preset to 5000 on NP A2 136, the NP A2 136 begins processing packets for the anti-replay connection by incrementing the sequence number and sending a packet 270 with sequence number 5001. Because 5001 is higher than the current window on NP B1 144 ("45-55"), the NP B1 144 will accept and process the packet, and slide the window to a new value ("4991-5001").

The NP A2 136 is also configured to indicate to the control plane A 132 that the NP A2 136 has taken ownership of the anti-replay connection in a manner similar to the indication sent by NP A1 134 when establishing the anti-replay connection. Upon receiving this indication, the control plane A 132 proceeds to effect presetting of the sequence numbers held by other network processors for the anti-replay connection. As shown, the NPs 134, 138, 154, 156, 158 have been preset to a value of "7500," thereby accommodating a possible further switchover before rekeying in complete.

Further, because the message 270 is sent with a sequence number "5001" that surpasses the re-key threshold, the NP A2 136 sends an indication to the control plane A 132 that the re-key threshold has been passed. The control plane A 132 then communicates with the control plane B 142 to re-key the anti-replay connection and reset the sequence number for the NP A2 136 and the window for NP B1 144. For example, the control planes 132, 142 may establish a new security association according to the IPSec protocol. Thereafter, the control planes 132, 152 may also reset the sequence numbers on the network processors 134, 138, 154, 156, 158 that do not currently own the connection to the first preset value (in this example, "5000").

It will be understood that, while the mechanics described above are described with respect to a single anti-replay connection, these methods and arrangements may be extended and duplicated to support multiple anti-replay connections between diverse network devices. Further, it will be apparent that the mechanics described herein may also be implemented in the reverse direction, such that, for example, the router B 140 is also capable of performing as has been described for router A 130 and router C 150. Various modifications will be apparent.

Figure 3:
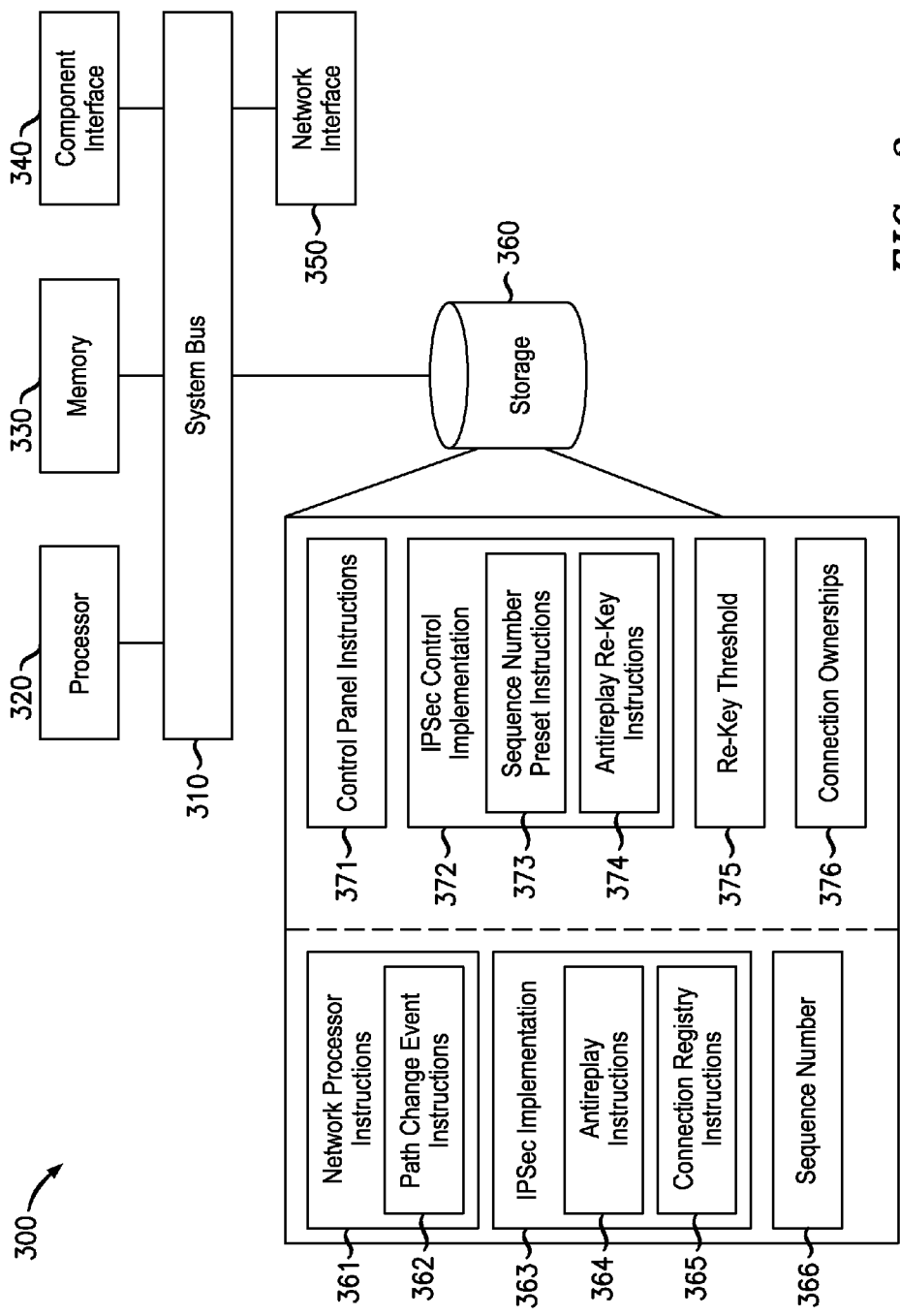
FIG. 3 illustrates an exemplary hardware diagram for implementing a network device control plane or network processor.

FIG. 3 illustrates an exemplary hardware diagram 300 for implementing a network device control plane or network processor. The exemplary hardware 300 may correspond to any of the devices 130, 140, 150 of the exemplary environments 100, 200. Further, similar hardware to the exemplary hardware 300 may implement devices 110, 115 with little modification (e.g., component interface 340 may be omitted) where the anti-replay connection is terminated by an end user device at one or both ends. For example, the exemplary hardware 300 may implement a control plane, one or more network processors, or an entire router. As shown, the hardware 300 includes a processor 320, memory 330, component interface 340, network interface 350, and storage 360 interconnected via one or more system buses 310. It will be understood that FIG. 3 constitutes, in some respects, an abstraction and that the actual organization of the components of the hardware 300 may be more complex than illustrated.

The processor 320 may be any hardware device capable of executing instructions stored in memory 330 or storage 360. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The component interface 340 may include one or more devices communicating with other components within a system of which the hardware is a part. For example, the component interface 340 may enable communication with a network processor where the hardware 300 implements a control plane Likewise, the component interface 340 may enable communication with a control plane where the hardware 300 implements a network processor. Accordingly, the component interface 340 may receive event indications such as, for example, re-key threshold indications and anti-replay connection ownership indications. Various hardware interfaces for enabling such intrasystem communication will be apparent.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon which the processor 320 may operate. For example, where the hardware 300 implements a network processor, the storage 360 may store network processor instructions 361 for coordinating basic network processor functionality such as receiving packets, determining a next hop, forwarding packets, and reporting events. For example, the network processor instructions 361 include path change event instructions 362 for identifying when the network processor has taken over an active connection. The storage 360 also stores an IPSec implementation 363 for implementing various features of the IPSec protocol suite such as anti-replay instructions 364 for maintaining a sequence number 366 to be added to successive packets. The IPSec implementation 363 also includes connection registry instructions 365 for reporting to a control plane when the network processor takes ownership of an anti-replay connection, such as may be determined by a path change event.

When the hardware additionally or alternatively implements a control plane, the storage 360 includes control plane instructions 371 for performing basic control plane functionality such as signaling other network devices, receiving network updates, and pushing updated forwarding information to network processors. The storage 360 also includes an IPSec control implementation 372 for performing those portions of the IPSec protocol suite that are implemented at the control level. For example, the IPSec control implementation 372 includes sequence number preset instructions 373 for presetting a sequence numbers of network processors for an anti-replay connection upon receiving a new ownership indication. As another example, the IPSec control implementation 372 includes anti-replay re-key instructions 374 for re-keying an anti-replay connection after the re-key threshold 375 for the connection has been surpassed. The storage 360 also maintains a table of connection ownerships 376 indicating for at least each anti-replay connection which network processor is currently registered as the owner.

It will be apparent that various information described as stored in the storage 360 may be additionally or alternatively stored in the memory 330. For example, the user location log 365 may be additionally, alternatively, or partially stored in the memory 330. In this respect, the memory 330 may also be considered to constitute a "storage device." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the hardware 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. In some embodiments, such as those wherein the hardware is implemented in a cloud computing architecture, components may be physically distributed among different devices. For example, the processor 320 may include a first microprocessor in a first data center and a second microprocessor in a second data center. Various other arrangements will be apparent.

Figure 4:
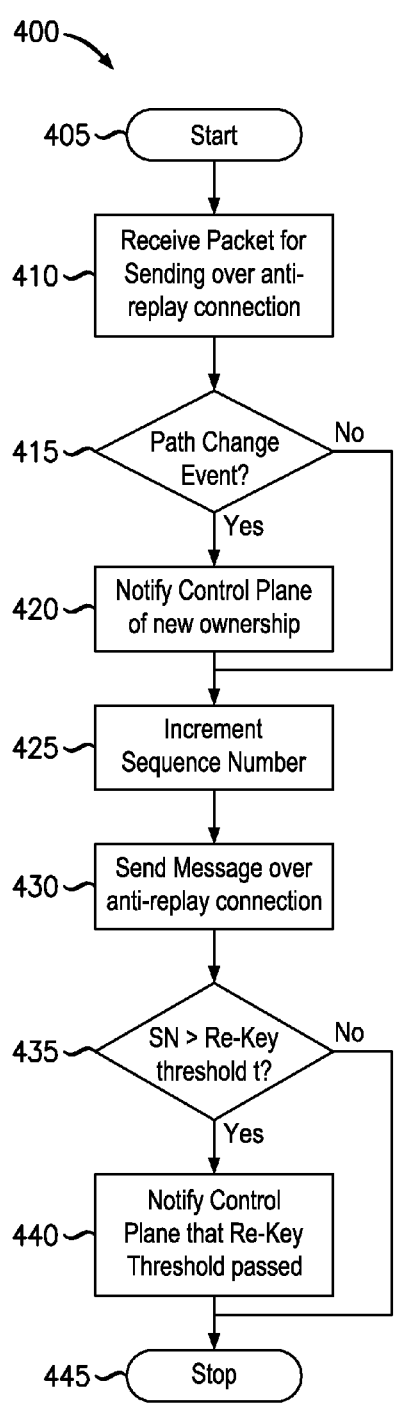
FIG. 4 illustrates an exemplary method performed by a network processor for processing a packet at an ingress of an anti-replay connection.

FIG. 4 illustrates an exemplary method 400 performed by a network processor for processing a packet at an ingress of an anti-replay connection. The method 400 may be performed by a network processor such as the network processors 134, 136, 138, 154, 156, 158 of exemplary environments 100, 200.

The method begins in step 405 and proceeds to step 410 where the network processor receives a packet for transmission over an anti-replay connection. For example, the network processor may receive an IPSec packet. Next, in step 415, the network processor determines whether the receipt of the packet triggers a path change event. For example, the network processor may determine whether this is the first packet seen for this anti-replay connection. If not, the method skips ahead to step 425. Otherwise, the network processor notifies the control plane in step 420 that the network processor has taken ownership of the anti-replay connection.

In step 425, the network processor increments the sequence number associated with the connection. Next, in step 430, the network processor sends the packet over the anti-replay connection according to the appropriate security protocols. For example, the network processor adds the current sequence number, as incremented in step 425, to the header of the packet or an encapsulation header added thereto. In step 435, the network processor determines whether the sequence number has surpassed the re-key threshold for the connection. If so, the network processor notifies the control plane in step 440 that the re-key threshold has been crossed. Alternatively, the control plane may poll or otherwise monitor the sequence numbers itself and steps 435, 440 may be omitted. The method 400 then proceeds to end in step 445.

It will be apparent that various embodiments may perform the steps of the method 400 in different orders and potentially in parallel. For example, an alternative method may perform step 430 prior to step 425. As another example, steps 415, 420 may be performed in parallel with steps 425, 430, 435, 440. Various other modifications will be apparent.

Figure 5:
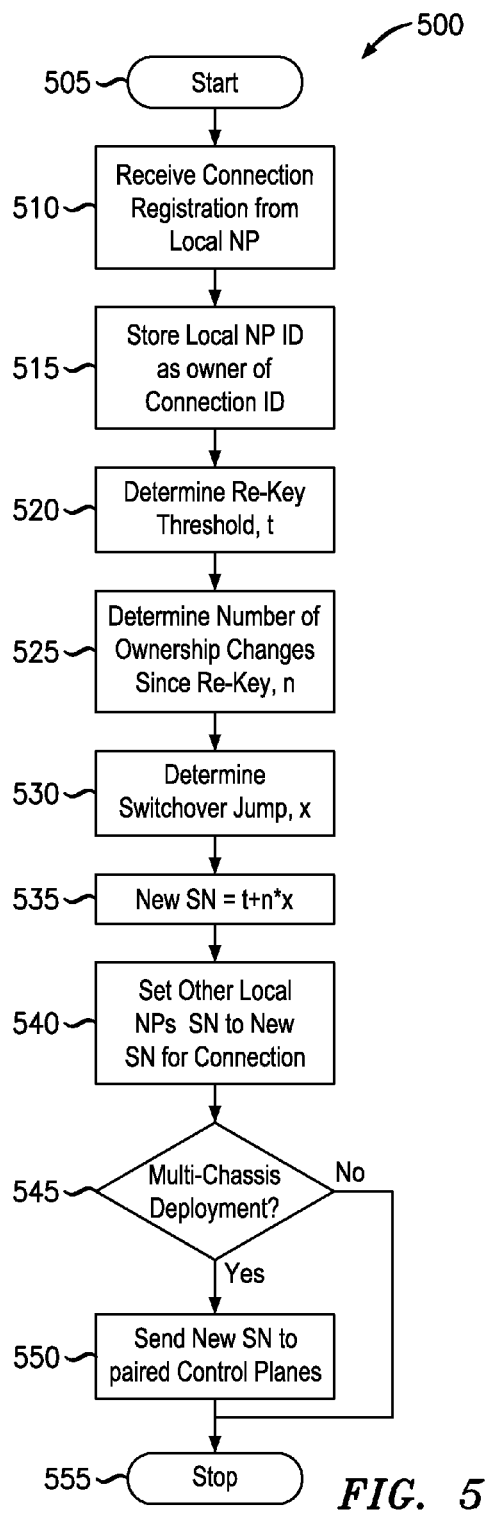
FIG. 5 illustrates an exemplary method performed by a control plane for processing a connection ownership registration.

FIG. 5 illustrates an exemplary method 500 performed by a control plane for processing a connection ownership registration. The method 400 may be performed by a control plane such as the control planes 132, 152 of exemplary environments 100, 200.

The method 500 begins in step 505 and proceeds to step 510 where the control plane receives a connection registration from a local network processor. The control plane stores the new ownership correlation in step 515 for future reference. Then, in step 520, the control plane determines the re-key threshold "t" associated with the anti-replay connection and, in step 525, determines how many times "n" the ownership of the anti-replay connection has changed since the last re-keying of the connection. This value "n" may be stored, for example, with the connection registry and incremented in step 515 and reset to zero on re-keying (e.g., due to the start of a new security association in IPSec embodiments).

In step 530, the control plane determines the "switchover jump" value "x." This value "x" may be preconfigured to provide a predetermined amount of time, such as 10 seconds, between reaching the re-key threshold or switchover in connection ownership and reaching the preset sequence number on other network processors. In step 535, the control plane calculates the new sequence number as $t+n*x$. Then, in step 540, the control plane effects presetting of other local network processors by transmitting an instruction to set the sequence number for the anti-replay connection to the computed value. Then, in step 545, the control plane determines whether the anti-replay connection is supported by a multi-chassis deployment. If so, the control plane effects presetting of network processors on other relevant network devices in step 550 by sending the new sequence number value to the other network devices via a control link such as, for example, a virtual router redundancy protocol (VRRP) connection. The method then proceeds to end in step 555.

In view of the foregoing, various embodiments enable the hitless switchover of an anti-replay connection between network processors. For example, by presetting potential switchover targets with a sequence number that is beyond a re-key threshold, when switchover occurs, packets with the preset sequence number will not be discarded. Further, the preset sequence number will, in many embodiments, trigger a re-key of the connection, including a sequence number reset. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for performing switchover of an anti-replay connection, the method comprising:

receiving, at the network device, an ownership indication that a first network processor is currently serving the anti-replay connection; and in response to receiving the ownership indication, effecting a presetting in a second network processor of a current sequence number (SN) for the anti-replay connection to a first value that is greater than or equal to a re-key threshold value, wherein the network device comprises at least one of the first network processor and the second network processor, the re-key threshold value is a value beyond which an SN triggers re-keying of the anti-replay connection, and the second network processor utilizes the current SN upon beginning to serve the anti-replay connection.

2. The method of claim 1, wherein the second network processor is part of a different network device from the network device and the step of effecting the presetting in the second network processor of the current SN comprises:
communicating with the different network device via a control link to indicate that SN presetting is to be performed.

3. The method of claim 1, further comprising:
receiving a further ownership indication that the second network processor is currently serving the anti-replay connection; and
in response to receiving the further ownership indication, effecting a presetting in a third network processor of the current SN for the anti-replay connection to a second value that is greater than the first value.

4. The method of claim 3, wherein a difference between the re-key threshold value and the first value is the same as a difference between the first value and the second value.

5. The method of claim 1, further comprising:
selecting a difference between the re-key threshold value and the first value to provide the first network processor with a predetermined amount of time of serving the anti-replay connection after reaching the re-key threshold value and before reaching the first value, wherein the predetermined amount of time is at least ten seconds.

6. The method of claim 1, further comprising:
receiving an indication that the second network processor has transmitted a message for the anti-replay connection having an SN greater than or equal to the re-key threshold value;
in response to receiving the indication that the second network processor has transmitted the message for the anti-replay connection having the SN greater than or equal to the re-key threshold value, effecting re-keying of the anti-replay connection with at least one downstream device.

7. The method of claim 1, wherein at least one of the network device and a downstream device at an opposite end of the anti-replay connection is a host device.

8. A network device for performing switchover of an anti-replay connection, the network device comprising:
a control plane processor configured to receive an ownership indication that a first network processor is currently serving the anti-replay connection, and, in response to receiving the ownership indication, effect a presetting in a second network processor of a current sequence number (SN) for the anti-replay connection to a first value that is greater than or equal to a re-key threshold value, wherein the re-key threshold value is a value beyond which an SN triggers re-keying of the anti-replay connection, and the second network processor utilizes the current SN upon beginning to serve the anti-replay connection; and
at least one of the first network processor and the second network processor.

9. The network device of claim 8, wherein the second network processor is part of a different network device from the network device and, in effecting a presetting in the second network processor of the current SN, the control plane processor is configured to communicate with the different network device via a control link to indicate that SN presetting is to be performed.

10. The network device of claim 8, wherein the control plane processor is configured to receive a further ownership indication that the second network processor is currently serving the anti-replay connection, and in response to receiving the further ownership indication, effect a presetting in a third network processor of a current SN for the anti-replay connection to a second value that is greater than the first value.

11. The network device of claim 10, wherein a difference between the re-key threshold value and the first value is the same as a difference between the first value and the second value.

12. The network device of claim 8, wherein the difference between the re-key threshold value and the first value is selected to provide the first network processor with a predetermined amount of time of serving the anti-replay connection after reaching the re-key threshold value and before reaching the first value, and the predetermined amount of time is at least ten seconds.

13. The network device of claim 8, wherein the control plane processor is configured to receive an indication that the second network processor has transmitted a message for the anti-replay connection having an SN greater than or equal to the re-key threshold value, and in response to receiving the indication that the second network processor has transmitted the message for the anti-replay connection having the SN greater than or equal to the re-key threshold value, effect re-keying of the anti-replay connection with at least one downstream device.

14. A non-transitory machine-readable storage medium encoded with instructions for execution by a network device for performing switchover of an anti-replay connection, the non-transitory machine-readable storage medium comprising:
instructions for receiving, at the network device, an ownership indication that a first network processor is currently serving the anti-replay connection; and
instructions for, in response to receiving the ownership indication, effecting a presetting in a second network processor of a current sequence number (SN) for the anti-replay connection to a first value that is greater than or equal to a re-key threshold value, wherein the network device comprises at least one of the first network processor and the second network processor, the re-key threshold value is a value beyond which an SN triggers re-keying of the anti-replay connection, and the second network processor utilizes the current SN upon beginning to serve the anti-replay connection.

15. The non-transitory machine-readable storage medium of claim 14, wherein the second network processor is part of a different network device from the network device and the instructions for effecting the presetting in the second network processor of the current sequence number (SN) comprise:
instructions for communicating with the different network device via a control link to indicate that SN presetting is to be performed.

16. The non-transitory machine-readable storage medium of claim 14, further comprising:
instructions for receiving a further ownership indication that the second network processor is currently serving the anti-replay connection; and instructions for, in response to receiving the further ownership indication, effecting a presetting in a third network processor of the current sequence number (SN) for the anti-replay connection to a second value that is greater than the first value.

17. The non-transitory machine-readable storage medium of claim 16, wherein a difference between the re-key threshold value and the first value is the same as a difference between the first value and the second value.

18. The non-transitory machine-readable storage medium of claim 14, wherein the difference between the re-key threshold value and the first value is selected to provide the first network processor with a predetermined amount of time of serving the anti-replay connection after reaching the re-key threshold value and before reaching the first value, and the predetermined amount of time is at least ten seconds.

19. The non-transitory machine-readable storage medium of claim 14, further comprising:
   instructions for receiving an indication that the second network processor has transmitted a message for the anti-replay connection having an SN greater than or equal to the re-key threshold value;
   instructions for, in response to receiving the indication that the second network processor has transmitted the message for the anti-replay connection having the SN greater than or equal to the re-key threshold value, effecting re-keying of the anti-replay connection with at least one downstream device.

20. The non-transitory machine-readable storage medium of claim 14, wherein at least one of the network device and a downstream device at an opposite end of the anti-replay connection is a host device.

\* \* \* \* \*